United States Patent [19]

Walsh

[11] Patent Number: 4,699,667

[45] Date of Patent: Oct. 13, 1987

[54] REMOVING RESIDUAL PCB S FROM TRANSFORMERS

[75] Inventor: Edward J. Walsh, Hermitage, Pa.

[73] Assignee: Westinghouse Electric Corp., Pittsburgh, Pa.

[21] Appl. No.: 551,753

[22] Filed: Nov. 14, 1983

[51] Int. Cl.[4] .......................... B08B 5/00; B01D 15/04

[52] U.S. Cl. ........................................ 134/12; 134/21; 208/262; 210/694; 210/909

[58] Field of Search ........................ 134/10, 11, 12, 21, 134/31, 105, 109; 210/909, 694; 208/262

[56] References Cited

U.S. PATENT DOCUMENTS

| | | | |
|---|---|---|---|
| 3,385,735 | 5/1968 | Brabrand et al. | 134/28 |
| 4,299,704 | 11/1981 | Foss | 210/909 |
| 4.304,612 | 12/1981 | Masuda | 134/19 |
| 4,382,865 | 5/1983 | Sweeny | 210/909 |
| 4,387,018 | 6/1983 | Cook et al. | 208/262 |
| 4,396,436 | 8/1983 | Laemmle et al. | 134/12 |
| 4,425,949 | 1/1984 | Rowe, Jr. | 134/21 |
| 4,430,208 | 2/1984 | Pytlewski et al. | 208/262 |

*Primary Examiner*—Richard V. Fisher
*Assistant Examiner*—W. Gary Jones
*Attorney, Agent, or Firm*—R. D. Fuerle

[57] ABSTRACT

Disclosed is a method and apparatus for removing residual polychlorinated biphenyls from transformers. A vaporized solvent which forms a low-boiling azeotrope with polychlorinated biphenyls is passed through the transformer. The vaporized azeotrope is removed from the transformer, condensed, and the PCB's in the azeotrope are removed and/or destroyed. The apparatus includes means for vaporizing the solvent which forms the low-boiling azeotrope with the PCB's, a pump means for passing the vaporized solvent through the transformer, a condensing means for condensing the vaporized azeotrope, and treatment means for destroying the polychlorinated biphenyls removed from the transformer in the azeotrope.

7 Claims, 1 Drawing Figure

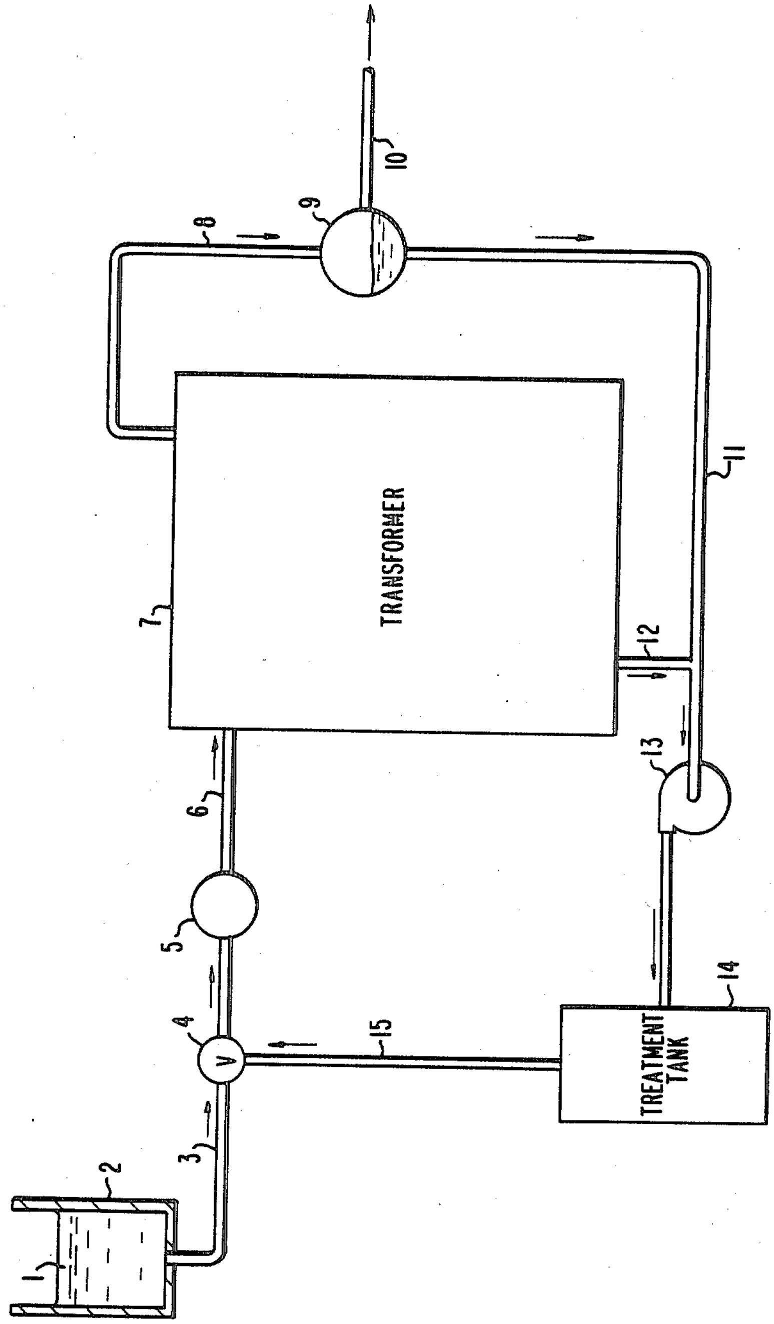
TRANSFORMER
TREATMENT TANK
V
1
2
3
4
5
6
7
8
9
10
11
12
13
14
15

REMOVING RESIDUAL PCB S FROM TRANSFORMERS

BACKGROUND OF THE INVENTION

As a result of the banning of polychlorinated biphenyls (PCB's) for use as dielectric fluids in transformers (and other electrical equipment) as environmental hazards, it has been necessary to remove the PCB's already in transformers and destroy them. While the bulk of the PCB's in a transformer can be easily removed by draining the transformer, small amounts of residual PCB's are always left behind in the transformer and must also be removed and disposed of.

Typically, residual PCB's in transformers are removed using solvent flushes. That is, a solvent for the PCB's, such as mineral spirits, is repeatedly flushed through the transformer, collected, and destroyed, usually by burning. This is a hazardous and expensive procedure as it is necessary to ship the solvents containing the PCB's to disposal plants for burning. Also, it results in the loss of the solvent. Finally, this method of removing residual PCB's from transformers is not thorough enough to permit the reclamation of the materials in the transformer, and it is necessary to dispose of the entire transformer by burial under the ground.

SUMMARY OF THE INVENTION

I have discovered that residual PCB's can be removed from transformers by the addition of a vaporized solvent to the transformer which forms a low-boiling azeotrope with the PCB's in the transformer. This method is considerably less expensive and less hazardous because the PCB's can be collected or destroyed on site and the solvent can be recovered and reused. Also, the method of this invention removes the polychlorinated biphenyls from the transformer so thoroughly that the copper and other valuable materials in the transformer can be reclaimed and reused, or the transformer can be refilled with oil or another acceptable dielectric fluid and reused as a transformer.

DESCRIPTION OF THE INVENTION

The accompanying drawing is a block diagram of certain presently preferred apparatus suitable for removing residual PCB's from transformers.

In the drawing, solvent 1 in holding tank 2 passes through line 3 and valve 4 into vaporizer 5. The vaporized solvent then passes through line 6 into transformer 7 where it forms an azeotrope with residual PCB's in the transformer. The vaporized azeotrope passes through line 8 into condenser 9 under the influence of a vacuum in line 10. The liquid azeotrope then passes through line 11, along with liquid azeotrope which may have condensed in the transformer from line 12, through pump 13 into PCB treatment tank 14 where the PCB's are separated from the azeotrope or are destroyed. The remaining solvent is then recycled through line 15 until the transformer has been purged of PCB's.

In this invention, a solvent is used to form a low-boiling eutectic mixture (i.e., an azeotropic solution) with PCB's in a transformer. A low-boiling azeotrope is a fixed ratio mixture of the solvent and the PCB's which boils at a lower temperature than does either the solvent or the PCB's. A low-boiling azeotrope is required to minimize the amount of energy needed to purge the transformer of PCB's. Preferably the solvent should boil at a temperature of less than 150° C. to further minimize the amount of energy required. Solvents which form low-boiling azeotropes with PCB's include water, methanol, toluene, and acetonitrile. Of these solvents, water is preferred as it is the most efficient in that it removes the greatest quantity of PCB's with the least amount of energy.

In the practice of this invention, the transformer is first drained as thoroughly as possible of the PCB's, which are then packaged and destroyed by incineration or other process as is known in the art. The solvent is then heated to its boiling point and its vapors are pumped into the transformer where they form the azeotrope with the residual PCB's. Since the azeotrope boils at a lower temperature than does the solvent, the azeotrope is immediately vaporized and the vaporized azeotrope can be drawn out of the transformer to remove the PCB's. A vacuum is preferably used to aid in the removal of the azeotrope from the transformer as this lowers the temperature requirement and further saves on energy. It is also preferable to alternate pumping the solvent vapor into the transformer and removing the azeotrope vapor by vacuum so that the azeotrope has time to form and the vacuum does not merely remove the vaporized solvent. This can be accomplished, for example, by alternating about 10 minutes of vapor impregnation with the solvent followed by about 5 minutes of removal under vacuum of the vaporized azeotrope.

When the temperature within the transformer has risen above the boiling point of the azeotrope, and preferably above the boiling point of the solvent, the PCB's will have been removed from the transformer and the procedure can be terminated. The time required to cleanse the transformer of residual PCB's depends upon the size of the transformer and can range from a few hours for a small transformer up to many days for a very large transformer.

The vaporized azeotrope collected from the transformer is permitted to cool and condense into a liquid. Depending on the solvent used, upon liquefaction the azeotrope may separate into two phases, a PCB phase and an azeotrope phase, with the denser phase, usually the PCB's, at the bottom. The PCB phase can be collected and destroyed by procedures well known in the art, and the remaining liquid azeotrope can be recycled through the transformer to remove additional PCB's from the transformer. An alternative procedure, useful if no phase separation occurs, is to remove or destroy all of the PCB's in the condensate. This is the preferred procedure as it is more efficient since it results in a solvent which does not contain PCB's and which can therefore remove a larger quantity of PCB's from the transformer. Also, it takes less equipment and is therefore less expensive. Removal of the PCB's can be accomplished using activated charcoal or some other PCB absorbent such as chloroprene. After the absorbents have been saturated with PCB's, they are removed and destroyed. Destruction of the PCB's in situ can be accomplished by exposure to UV light and ozone which is sparged through the liquid. Depending on the solvent that is used, other commercial methods of PCB destruction such as contact with metallic sodium may also be suitable. Destruction of the PCB's in situ is preferred to removal on an absorbent because less handling is involved and it is less hazardous.

The method of this invention can be applied to transformers or any other apparatus containing residual PCB's. Removal of the residual PCB's is extremely thorough, to such an extent that the equipment can usually be safely reused.

The following examples further illustrate this invention.

EXAMPLE 1

Into a 500 ml flask fitted with a distillation head, condenser, and collection flask was added 10 gms (8.2 ml) of polychlorinated biphenyls sold by Monsanto under the trade designation "Arochlor 1242," with 300 ml of various solvents. The mixture was thoroughly stirred and then boiled using a heating mantle. The first and second 100 ml of condensate was collected and tested for PCB content. If the condensate separated into phases, the quantity of PCB phase was measured as well at the PCB content in solution. The following table gives the results:

| SOLVENT | 100 ML FRACTION | (°C.) VAPOR TEMPERATURE | PCB CONCENTRATION IN SOLUTION OF CONDENSATE (PPM) | VOLUME PCB IN COLLECTION FLASK |
|---|---|---|---|---|
| $H_2O$ (Water) | 1 | 99 | 206 | 2.4 ml |
| $H_2O$ (Water) | 2 | 99 | 201 | 3.1 ml |
| Methanol | 1 | 63 | 520 | None |
| Methanol | 2 | 64 | 6,600 | 0.2 ml |
| Toluene | 1 | 105 | 1,420 | None |
| Toluene | 2 | 104 | 7,900 | None |
| Acetonitrile | 1 | 80 | 1,080 | None |
| Acetonitrile | 2 | 81 | 9,200 | None |

The table shows that the four solvents tested formed azeotropes with the PCB's which boiled over and collected in the condensate. Water seemed to be the most effective solvent.

I claim:

1. A method of removing residual polychlorinated biphenyls from apparatus comprising:
   (1) passing water vapor through said apparatus to form a low-boiling azeotrope of said polychlorinated biphenyls and said water vapor;
   (2) applying a vacuum to said apparatus to remove said azeotrope from said apparatus; and
   (3) cooling said azeotrope to a liquid.

2. A method according to claim 1 including collecting any polychlorinated biphenyl phase which separates from said liquid azeotrope, and destroying it.

3. A method according to claim 1 wherein the polychlorinated biphenyls in said liquid azeotrope are removed using activated carbon, and are then destroyed.

4. A method according to claim 1 wherein said polychlorinated biphenyls in said liquid azeotrope are destroyed in situ using ultraviolet light and ozone.

5. A method according to claim 1 wherein the application of said vacuum is alternated with passing said water vapor through said apparatus.

6. A method according to claim 5 wherein said alternating is continued until the temperature inside said apparatus is above the boiling point of said azeotrope.

7. A method according to claim 1 wherein said apparatus is a transformer.

* * * * *